US009557485B2

(12) United States Patent
Kojima et al.

(10) Patent No.: US 9,557,485 B2
(45) Date of Patent: Jan. 31, 2017

(54) SYSTEM AND METHOD FOR MANIPULATING POLARIZATIONS OF OPTICAL SIGNAL

(71) Applicants: Mitsubishi Electric Research Laboratories, Inc., Cambridge, MA (US); Mitsubishi Electric Corporation, Chiyoda-ku, Tokyo (JP)

(72) Inventors: Keisuke Kojima, Weston, MA (US); Manuela Felicetti, Sunnyvale, CA (US); Toshiaki Koike-Akino, Malden, MA (US); Bingnan Wang, Belmont, MA (US); Satoshi Nishikawa, Tokyo (JP); Eiji Yagyu, Tokyo (JP)

(73) Assignees: Mitsubishi Electric Research Laboratories, Inc., Cambridge, MA (US); Mitsubishi ELecrtic Corporation, Tokyo (JP)

( * ) Notice: Subject to any disclaimer, the term of this patent is extended or adjusted under 35 U.S.C. 154(b) by 0 days.

(21) Appl. No.: 14/665,372

(22) Filed: Mar. 23, 2015

(65) Prior Publication Data
US 2016/0282555 A1 Sep. 29, 2016

(51) Int. Cl.
*G02B 6/12* (2006.01)
*G02B 6/27* (2006.01)
(Continued)

(52) U.S. Cl.
CPC ............. *G02B 6/2773* (2013.01); *G02B 6/126* (2013.01); *G02B 6/136* (2013.01); *G02B 6/2726* (2013.01);
(Continued)

(58) Field of Classification Search
None
See application file for complete search history.

(56) References Cited

U.S. PATENT DOCUMENTS 7,035,494 B1 * 4/2006 Mackie ................ G02B 6/2813
385/129
7,734,122 B1 * 6/2010 Mackie .............. G02B 6/12007
385/14

(Continued)

OTHER PUBLICATIONS

T. Le et al. The design of SOI-MMI couplers with arbitrary power splitting ratios using slotted waveguide structures. LEOS Annual Meeting Conference Proceedings, Oct. 2009, pp. 246-247. INSPEC #11000305, DOI #10.1109/LEOS.2009.5343297.*

(Continued)

*Primary Examiner* — Mike Stahl
(74) *Attorney, Agent, or Firm* — Gene Vinokur; James McAleenan; Hironori Tsukamoto

(57) ABSTRACT

An optical manipulator includes a first section for propagating an optical signal with multiple polarization modes including a transverse electric (TE) mode and a transverse magnetic (TM) mode and a second section for propagating separately the TE mode and the TM mode of the optical signal. The optical manipulator also includes a multi-mode interference (MMI) section having a groove with a first refractive index less than a second refractive index of the MMI section. The groove extends along an entire length of the MMI section to partition the MMI section into two connected channels including a first channel and a second channel. The first section is connected to the first channel and the second section is connected to both the first and the second channels.

15 Claims, 6 Drawing Sheets

(51) Int. Cl.
  *G02B 6/126*  (2006.01)
  *G02B 6/136*  (2006.01)
(52) U.S. Cl.
  CPC . *G02B 2006/121* (2013.01); *G02B 2006/1215* (2013.01)

(56) References Cited

U.S. PATENT DOCUMENTS

| | | | | |
|---|---|---|---|---|
| 2003/0081873 | A1* | 5/2003 | Tan et al. | G02B 6/126 385/11 |
| 2007/0110363 | A1* | 5/2007 | Miyadera et al. | G02B 6/2813 385/27 |
| 2009/0214161 | A1* | 8/2009 | Tsuda et al. | G02F 1/3132 385/22 |
| 2013/0022310 | A1* | 1/2013 | Hamamoto | G02F 3/024 385/17 |
| 2014/0321823 | A1* | 10/2014 | Koike-Akino et al. | G02B 6/29344 385/123 |

OTHER PUBLICATIONS

Ghirardi, F.; Brandon, J.; Carre, M.; Bruno, A; Menigaux, L.; Carenco, A, "Polarization splitter based on modal birefringence in InP/InGaAsP optical waveguides," Photonics Technology Letters, IEEE , vol. 5, No. 9, pp. 1047,1049, Sep. 1993.

L.M. Augustin, R. Hanfoug, J. J. G. M. Van der Tol, W. J. M. De Laat, M. K. Smit, "A Compact Integrated Polarization Splitter/Converter in InGaAsP—InP," Photonics Technology Letters, IEEE, vol. 19, No. 17, 1286-1288, (2007).

Lin, Shiyun and Hu, Juejun and Crozier, Kenneth, "Ultracompact, broadband slot waveguide polarization splitter", Applied Physics Letters, 98, 151101 (2011), DOI:http://dx.doi.org/10.1063/1.3579243.

H. Fukuda, K. Yamada, T. Tsuchizawa, T. Watanabe, H. Shinojima, and S. Itabashi, "Ultrasmall polarization splitter based on silicon wire waveguides," Opt. Express 14, 12401-12408 (2006).

Daoxin Dai, "Silicon Polarization Beam Splitter Based on an Asymmetrical Evanescent Coupling System With Three Optical Waveguides," Lightwave Technology, Journal of , vol. 30, No. 20, pp. 3281,3287, Oct. 15, 2012.

Yao-Feng Ma; Ding-wei Huang, "A Compact Silicon-on-Insulator MMI-based Polarization Splitter," IEEE/LEOS International Conference on Optical MEMS and Nanophotonics, TuP34 (2007).

* cited by examiner

SYSTEM AND METHOD FOR MANIPULATING POLARIZATIONS OF OPTICAL SIGNAL

FIELD OF THE INVENTION

This invention relates generally to optical devices, and more particularly to multi-mode interference (MMI) devices for splitting or combining an optical signal with orthogonal polarization components.

BACKGROUND OF THE INVENTION

Controlling a polarization mode and a spatial mode of optical signals in photonic integrated circuits (PICs) is important for optical communication networks. For example, a conventional single mode optical fiber does not preserve the polarization mode. When the optical signal is coupled from a single mode optical fiber to the PICs, the signal decomposes into arbitrary compositions of two orthogonal polarization components, namely, a first component in a transverse electric (TE) mode, and a second component in a transverse magnetic (TM) mode. In many modules used in the PICs, the components in the TE and TM modes have different characteristics. For example, the components having different TE and TM modes propagate at different velocities in a high index contrast waveguide, and energy coupling coefficients of a micro-ring resonator for the TE and TM modes are different.

These polarization-dependent effects reduce the performances of the PICs, especially for high-speed communication. Also, most optical communication networks use only one polarization mode. Furthermore, if the components in both polarization modes are used in polarization-division multiplexing (PDM) systems, then the spectral efficiency of such systems can be increased.

Typically, systems for controlling polarization of optical signals, e.g., polarization transparent systems and polarization multiplexing systems, use various polarization manipulators, such as polarization converters and/or polarization splitters/combiners. For example, polarization splitters can be utilized in polarization transparent systems to solve, e.g., polarization dependence and polarization mode dispersion problems in the current photonic integrated circuits (PICs). Also, the polarization splitters can be utilized in polarization-division multiplexing (PDM) systems to increase the spectral efficiency.

Polarization splitters/combiners in PICs typically have very large size (length>1 mm), and requires processes specifically designed for these devices that make polarization splitters/combiners very complicated and expensive to fabricate.

For example, a polarization splitter based on a deeply etched multi-mode interference (MMI) waveguide is described by Rahman et al., "Design of optical polarization splitters in a single-section deeply etched MMI waveguide," Applied Physics B, vol. 73, p. 613-619, 2001. In this case, a long (>2 mm) MMI with deeply-etched sidewall shows a small birefringence (i.e., different effective refractive indices between TE and TM modes). Therefore, the image of the input beam appears onto different output waveguides, depending on the polarization of the input beam.

In another example, a polarization splitter, based on two MMIs (one for 1×2 splitter, and the other for 2×2 coupler) and two waveguides connecting them, is described by Doerr (US 2010/0046886 A1). By choosing the different width for these waveguides such that TE and TM modes have different effective refractive indices, the input signal is guided to different output waveguides, depending on the input polarizations. Even though the actual device length is not specified in this application, it is conceivable that the total length exceeds 1 mm.

Accordingly, there is a need to reduce the length a polarization splitter or combiner.

SUMMARY OF THE INVENTION

Various embodiments of an invention are based on a realization that optical signals of different polarizations are coupled differently through a middle section in an multi-mode interference (MMI) section of an optical manipulator.

Accordingly, some embodiments of the invention manipulate the optical signals using an optical device, such as a device using MMI, with a non-uniform refractive index distribution within the MMI device. Specifically, the MMI has a groove region extending along the length of the MMI section, such that the MMI acts as two coupled waveguides. The coupling between the two waveguides depending on input modes, where it is a TE mode or a TM mode.

The groove region can have a lower refractive index compared to the waveguide sections. One embodiment uses an etched groove, while another embodiment uses a groove with lower refractive index material embedded between the waveguides.

In addition, some embodiments of the invention are based on the realization that input and output waveguides are attached directly to the MMI. Another embodiment uses tapered waveguide to attach input and output waveguides.

Accordingly, one embodiment of the invention discloses an optical manipulator including a first section for propagating an optical signal with multiple polarization modes including a transverse electric (TE) mode and a transverse magnetic (TM) mode; a second section for propagating separately the TE mode and the TM mode of the optical signal, and a multi-mode interference (MMI) section, wherein the MMI section includes a groove having a first refractive index less than a second refractive index of the MMI section and extending along an entire length of the MMI section to partition the MMI section into two connected channels including a first channel and a second channel, wherein the first section is connected to the first channel and the second section is connected to both the first and the second channels.

Another embodiment discloses an optical manipulator including a first section for propagating an optical signal with multiple polarization modes including a transverse electric (TE) mode and a transverse magnetic (TM) mode; a second section for propagating separately the TE mode and the TM mode of the optical signal; and a multi-mode interference (MMI) section, wherein the MMI section includes a groove having a first refractive index less than a second refractive index of the MMI section and extending along an entire length of the MMI section partitioning the MMI section into two connected channels including a first channel and a second channel, wherein the first section is connected to the first channel and the second section is connected to both the first and the second channels, wherein a length of the MMI section is less than 1 mm, and wherein dimensions of the groove and a refractive index within the groove are selected such that the TE mode and the TM mode of the optical signal are separated into the first and the second channels at an interface between the second section and the MMI section and merged at an interface between the first section and the first channel of the MMI section.

Yet another embodiment discloses an optical manipulator including a substrate layer including an indium phosphide (InP); a core layer including an indium gallium arsenide phosphide (InGaAsP) disposed on the substrate layer; and a cladding layer including the InP disposed on the core layer. The cladding layer includes a first section for propagating an optical signal with multiple polarization modes including a transverse electric (TE) mode and a transverse magnetic (TM) mode; a second section for propagating separately the TE mode and the TM mode of the optical signal; and a multi-mode interference (MMI) section, wherein the MMI section includes a groove having a first refractive index lower than a second refractive index of the MMI section and extending along an entire length of the MMI section partitioning the MMI section into two connected channels including a first channel and a second channel, wherein the first section is connected to the first channel and the second section is connected to the first channel and the second channels.

DETAILED DESCRIPTION OF THE PREFERRED EMBODIMENTS

Figure 1:
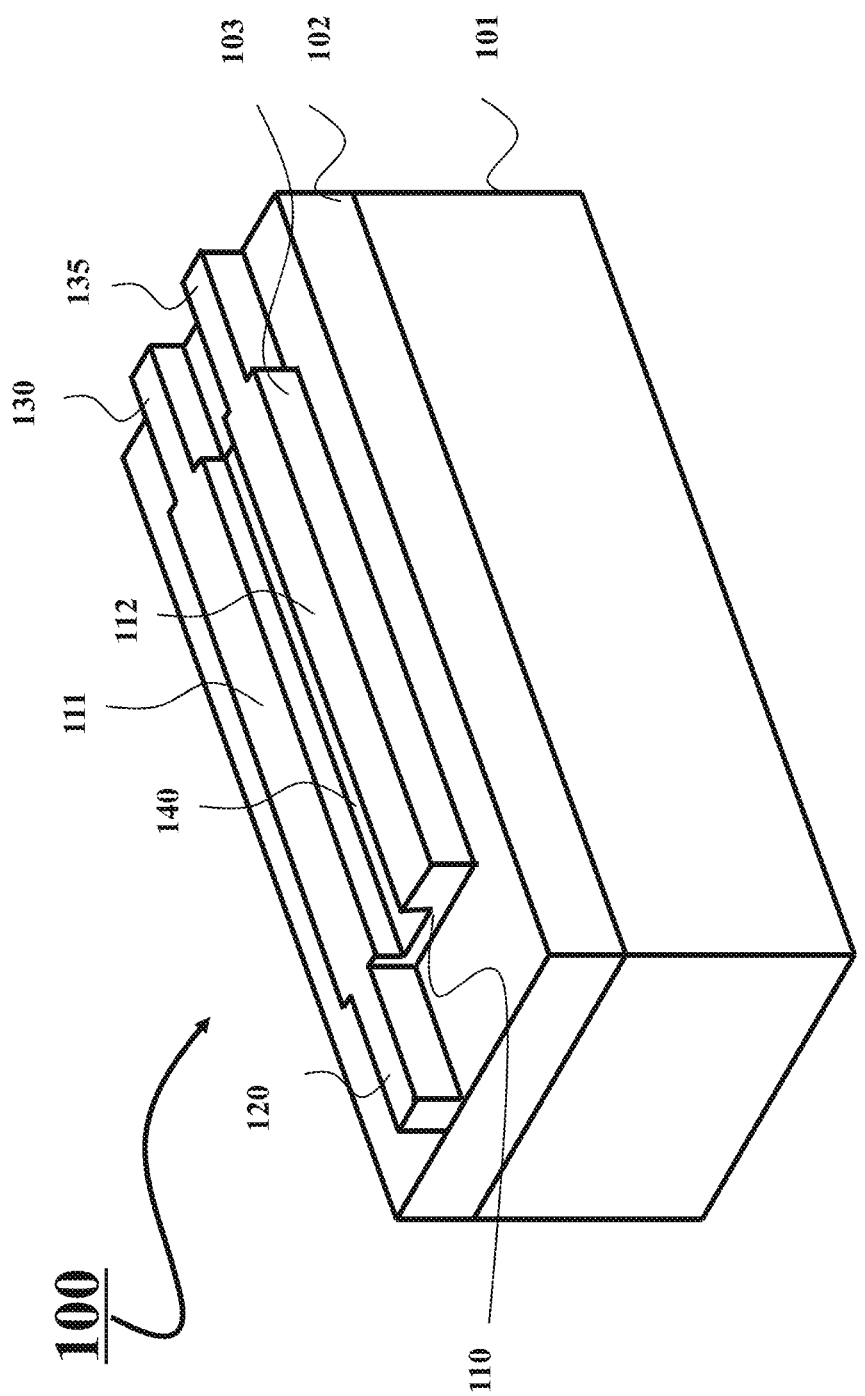
FIG. 1 is an isometric view of an exemplar optical manipulator in accordance with one embodiment of the invention.

FIG. 1 shows an isometric view of an exemplar optical manipulator 100 for manipulating an optical signal in accordance with one embodiment of the invention.

The optical manipulator can be implemented as an epitaxial-grown structure having layers of a substrate, a core and a cladding, as described below. For example, in one embodiment, the MMI device is an indium phosphide (InP)/indium gallium arsenide phosphide (InGaAsP) structure, which includes an InP substrate, an InGaAsP core layer with As composition of, e.g., 60% lattice matched to InP, and InP cladding layer. In another embodiment, the MMI device can include a silicon (Si) waveguide surrounded by silicon oxide (SiO). Other variations are possible and within the scope of the embodiments of the invention.

For example, the optical manipulator 100 includes a substrate layer, e.g., an InP layer 101, a core layer, e.g., an InGaAsP layer 102, grown on the substrate layer for propagating an optical signal, and a cladding layer, e.g., an InP layer 103, grown on the core layer for guiding the optical signal.

The optical manipulator 100 includes a first section 120 for propagating an optical signal with multiple polarization modes including a transverse electric (TE) mode and a transverse magnetic (TM) mode. The optical manipulator 100 includes a second section for propagating separately the TE mode and the TM mode of the optical signal. For example, in one embodiment, the first section includes a first waveguide 120 that can act as an input waveguide for inputting the optical signal and the second section include a second 130 and a third 135 waveguides that can act as two output waveguides for outputting two signals. In this embodiment, the optical manipulator 100 splits the optical signal into the first polarization and the second polarization, such that the optical manipulator acts as an optical splitter.

Additionally or alternatively, the propagation of the optical signal can be reversed, such that the second section including waveguides 130 and 135 inputs the optical signal with separated modes and the first section 120 outputs the optical signal with combined modes. In this embodiment, the optical manipulator 100 acts as an optical combiner.

The optical manipulator 100 also includes a multi-mode interference (MMI) section 110. The MMI section includes a groove 140 having a first refractive index different than a second refractive index of the MMI section and extending along an entire length of the MMI section partitioning the MMI section into two connected channels including a first channel 11 and a second channel 112.

In various embodiments, dimensions of the groove and a refractive index within the groove are selected such that the TE mode and the TM mode of the optical signal are separated into the first and the second channels at an interface between the second section and the MMI section and merged at an interface between the first section and the first channel of the MMI section. The groove region 140 can have different effective refractive index, typically lower than the rest of the MMI 110 and/or waveguides 120, 130, and 135.

Figure 2:
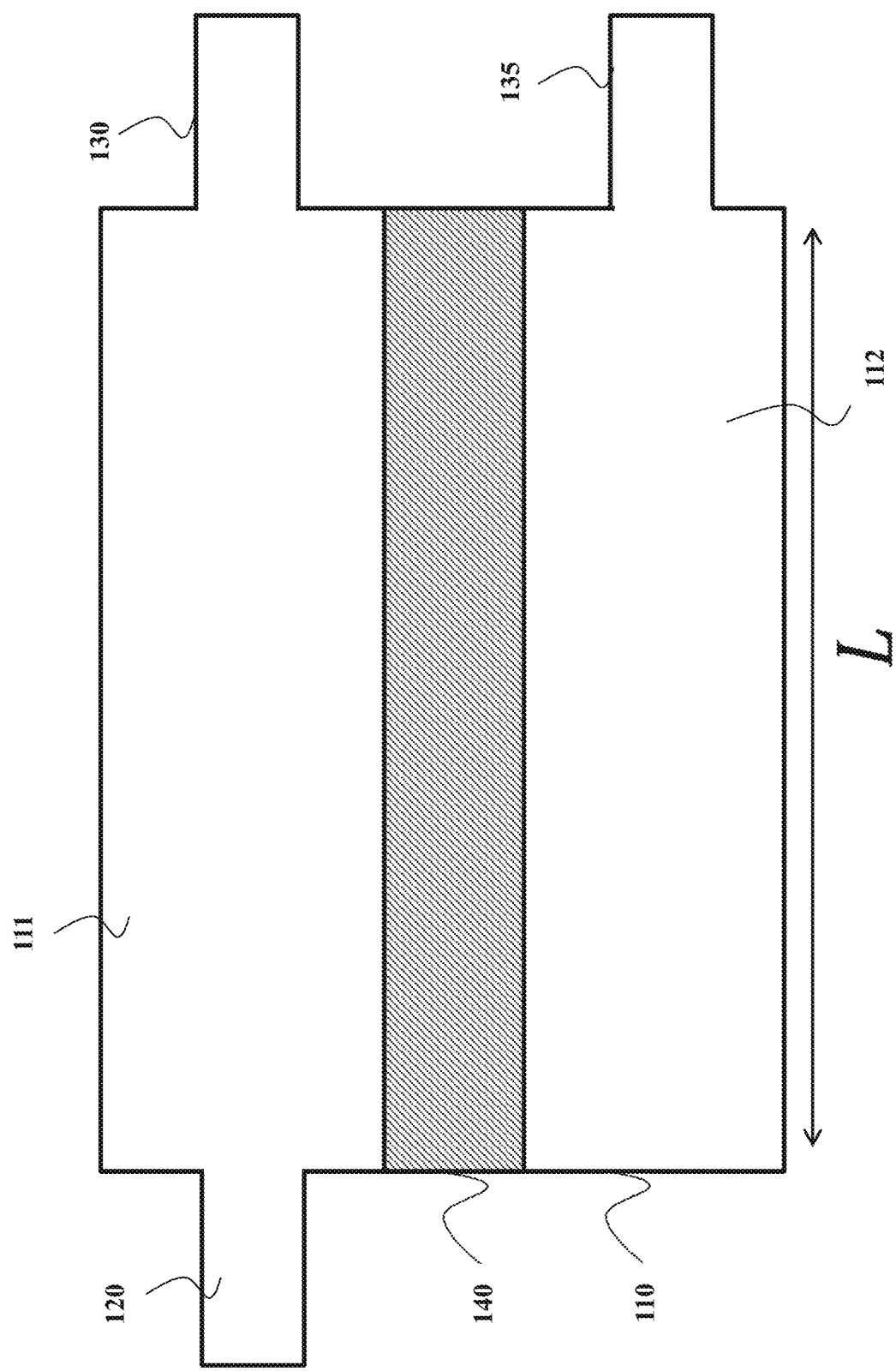
FIG. 2 is a top view of the optical manipulator of FIG. 1.

FIG. 2 shows the top view of the optical manipulator 100. The groove region 140 extends from the input side to the output side of the MMI device 110 along the entire length L of the MMI section. The input waveguide 120 is connected to one side of the MMI device 110, e.g., the first channel 111, while the output waveguides 130 and 135 are connected to each side of the MMI device, e.g., the waveguide 130 is connected to the first channel 111, and the waveguide 135 is connected to the second channel 112.

Figure 3:
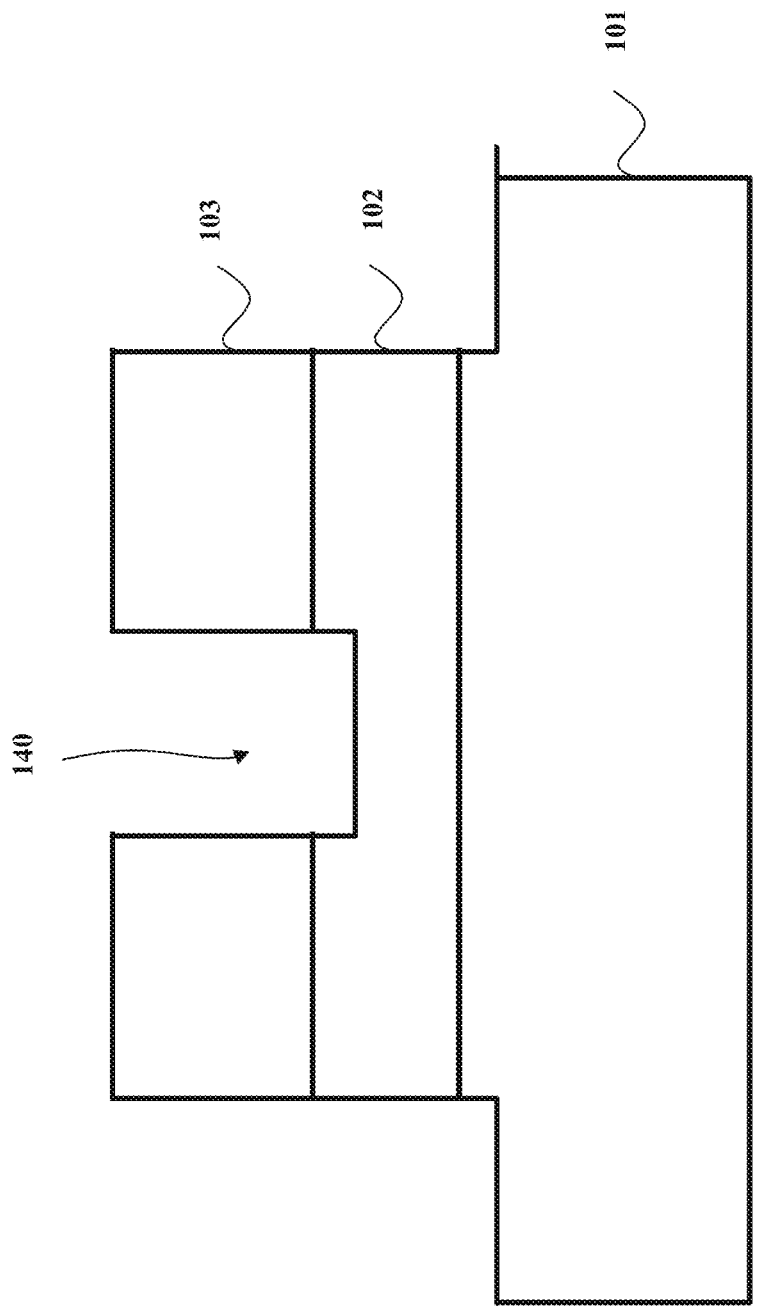
FIG. 3 is a cross section of the optical manipulator in the middle of the MMI according to one embodiment of the invention.

FIG. 3 shows a cross section of the MMI device 110 including the lower effective refractive index region 140. In the example, the core layer 102 is $In_{1-x}Ga_xAs_yP_{1-y}$ (0<y<1), between the InP substrate 101 and the InP cladding layer 103. The optical signal is concentrated in the core layer having a refractive index greater than refractive index of the cladding layer. The lower refractive index of the cladding layers serves as a support for the propagating optical signal along the depth of the MMI device.

In this embodiment, $In_{1-x}Ga_xAs_yP_{1-y}$ is a quaternary material, where x (from 0 to 1) is a fraction of Ga, and y (from 0 to 1) is a fraction of As. For example, if x=0 and y=0, the quaternary material is InP. Similarly, if x=1 and y=1, then the quaternary material is GaAs.

To grow InGaAsP material on top of InP, lattice matched condition defines relationship between x and y, such as x=0.42y. By specifying value of one component, e.g., y=0.4, the full composition of the material can be determined.

The MMI device 110 includes a groove region 140. In one embodiment, the MMI has etching into the upper cladding layer 103, or further into the core layer 102.

Figure 4:
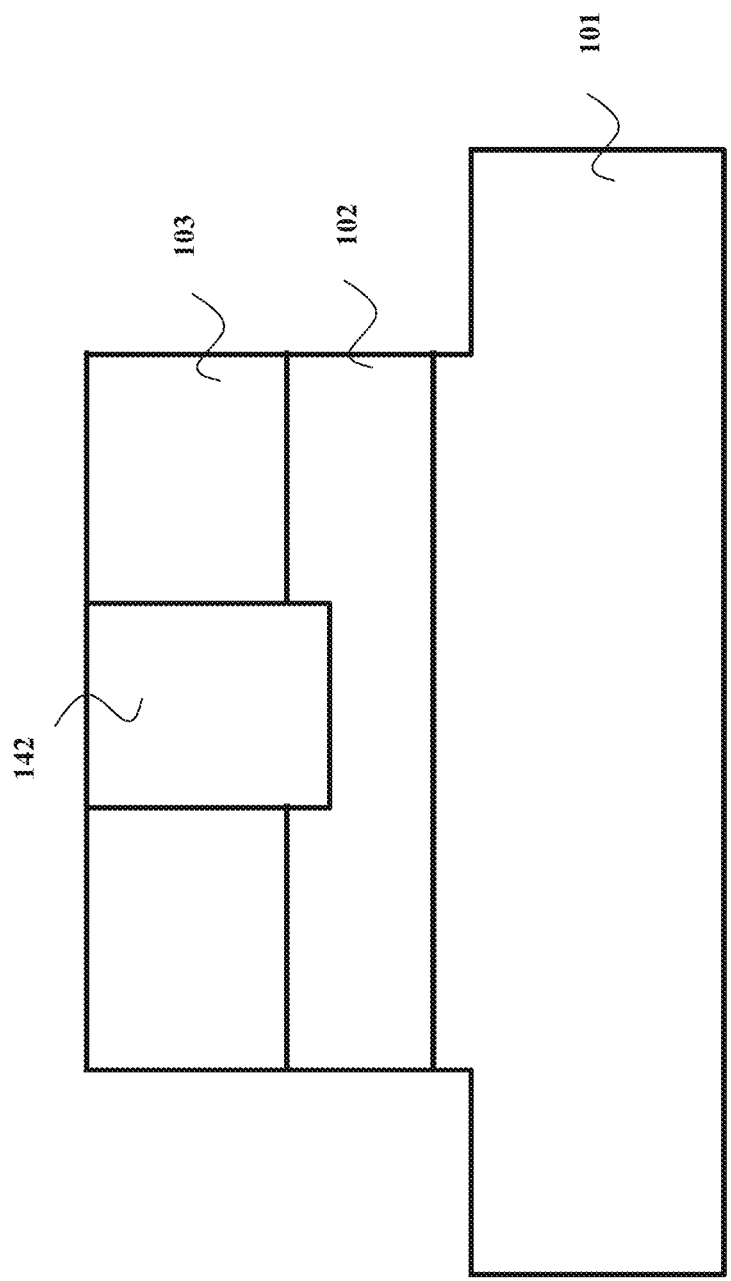
FIG. 4 is a cross section of the optical manipulator in the middle of the MMI according to another embodiment of the invention.

FIG. 4 shows another embodiment, in which the groove region 142 is filled with another material, such as InP, whose refractive index is less than the core layer 102.

Figure 5:
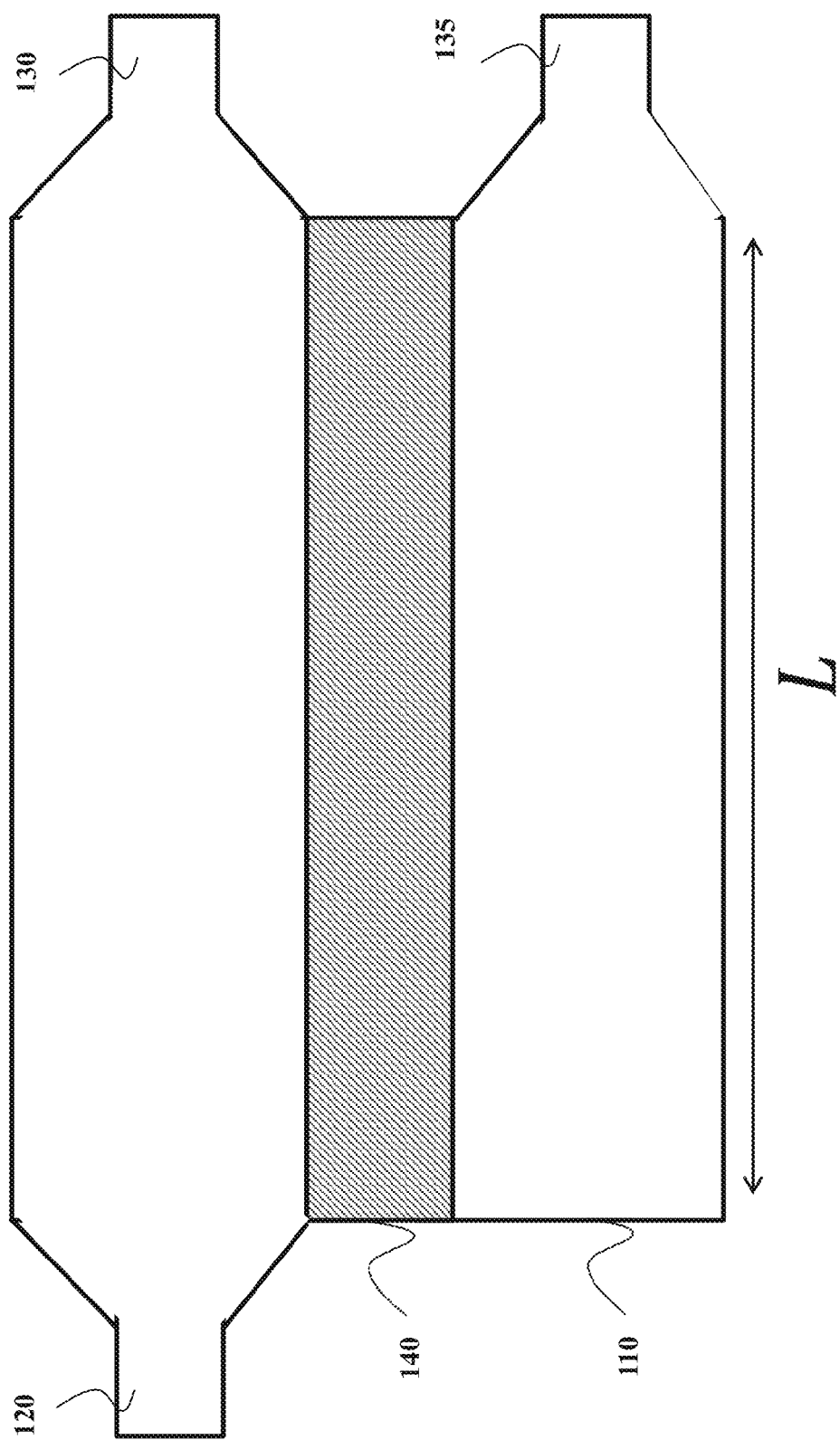
FIG. 5 is a top view of the optical manipulator according to one embodiment of the invention.

FIG. 5 shows a top view of the optical manipulator according to one embodiment of the invention that uses tapered coupling interface on one or two sides of the input and output waveguide. The tapered coupling between sections of the optical manipulator reduces optical coupling loss between the MMI section and the input/output waveguides.

Some embodiments of the invention are based on a realization that the TE mode and the TM mode of the optical signal propagate differently through channels of a waveguide having a groove extending along an entire length of the waveguide partitioning the waveguide into two connected channels. Thus, such the extended groove can be used to split or combine the modes of the optical signal.

Figures 6A, 6B:
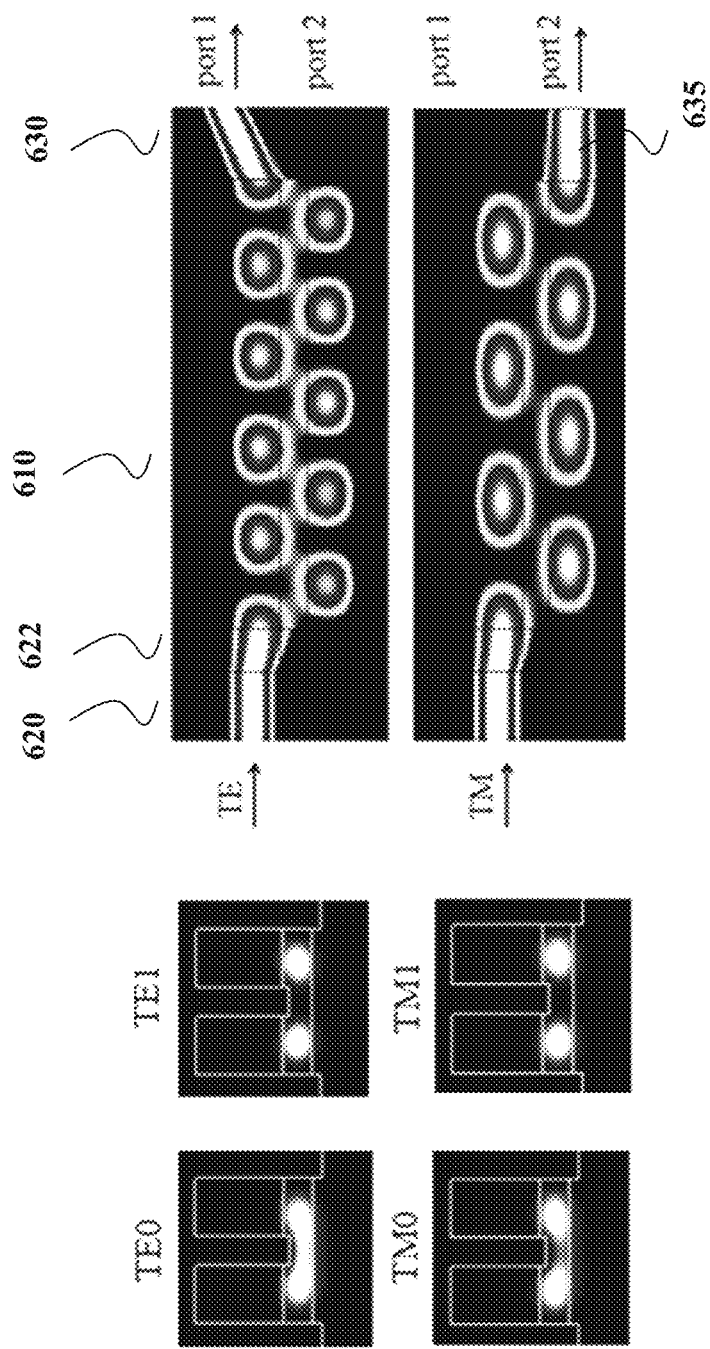
FIGS. 6A and 6B are images of simulated propagation of mode profiles of the optical signal according to some embodiments of the invention.

FIGS. 6A and 6B show images of simulated mode profiles of the fundamental and first-order modes for TE and TM modes, and the simulated beam propagations for TE and TM modes. As can be seen in the FIGS. 6A and 6B, the optical signal are separated into the first and the second channels at an interface between the second section and the MMI section and merged at an interface between the first section and the first channel of the MMI section.

In the example of FIG. 6A and 6B, the optical manipulator includes of a single mode input waveguide 620 ($W_{wg}$=1.5 µm), a short tapered section 622 ($L_{groove}$=36 µm) for a smooth mode transition, an MMI section 610 ($W_{MMI}$=2.5 µm and $L_{MMI}$=370 µm) and two output ports 630, 635 ($port_{1,2}=W_{wg}$). The input/output ports and the MMI section are fabricated as deeply etched grooves. The MMI section presents a shallow etched groove of 0.5 µm.

FIG. 6A shows the fundamental and first order TE and TM modes in the MMI section. Due to the different coupling length for TE and TM, the mode interference in the MMI section is such that the TE and TM input mode couple to port 1 and port 2 respectively. FIG. 6B shows the field propagation along the optical manipulator for TE or TM polarized input.

The TE and TM coupling lengths in the MMI section are defined as $$L_{\pi TE} = \frac{\pi}{\beta_{TE0} - \beta_{TE1}}$$
$$L_{\pi TM} = \frac{\pi}{\beta_{TM0} - \beta_{TM1}},$$

where $\beta_{TE0}$ and $\beta_{TE1}$ are the mode propagation constant for the fundamental and first order TE modes, while $\beta_{TM0}$ and $\beta_{TM1}$ are the mode propagation constant for the fundamental and first order TM modes. The calculated beat lengths are 37.52 µm for TE mode and 53.76 µm for TM mode. To split the TE and TM modes to port 1 and port 2 respectively, the overall length of the device, $L_{MMI}$ is given by, $$L_{MMI}=n \times L_{\pi TE}=(n-m) \times L_{\pi TM},$$

where n is an integer, and m is an odd integer. In our example above, the optimal MMI length is 370 µm, where m=10, and m=3. Thus, a polarization splitter of less than 1 mm long can be realized.

Although the invention has been described by way of examples of preferred embodiments, it is to be understood that various other adaptations and modifications may be made within the spirit and scope of the invention. Therefore, it is the object of the appended claims to cover all such variations and modifications as come within the true spirit and scope of the invention.

We claim:

1. An optical manipulator, comprising:
a first section for propagating an optical signal with multiple polarization modes including a transverse electric (TE) mode and a transverse magnetic (TM) mode;
a second section for propagating separately the TE mode and the TM mode of the optical signal; and
a multi-mode interference (MMI) section, wherein the MMI section includes a groove having a first refractive index less than a second refractive index of the MMI section and extending along an entire length of the MMI section to partition the MMI section into two connected channels including a first channel and a second channel, wherein the first section is connected to the first channel and the second section is connected to both the first and the second channels, wherein the first section includes a waveguide connected to the first channel, the second section includes a second waveguide connected to the first channel and a third waveguide connected to the second channel, wherein refractive indexes of the first channel, the second channel, the first waveguide, the second waveguide, and the third waveguide are equal, wherein one or combination of the first waveguide, the second waveguide and the third waveguide are connected to the MMI section through a tapered coupling interface.

2. The optical manipulator of claim 1, wherein dimensions of the groove and a refractive index within the groove are selected such that the TE mode and the TM mode of the optical signal are separated into the first and the second channels at an interface between the second section and the MMI section and merged at an interface between the first section and the first channel of the MMI section.

3. The optical manipulator of claim 1, further comprising:
a substrate layer;
a core layer disposed on the substrate layer for propagating the optical signal; and
a cladding layer disposed on the core layer for manipulating the optical signal.

4. The optical manipulator of claim 3, wherein the substrate layer and the cladding layer include indium phosphide (InP), and wherein the core layer includes an indium gallium arsenide phosphide (InGaAsP).

5. The optical manipulator of claim 3, wherein the groove is formed by etching the cladding layer.

6. The optical manipulator of claim 3, wherein the groove is formed by embedding into the cladding layer material with the first refractive index.

7. The optical manipulator of claim 1, wherein a length of the MMI section is less than 1 mm.

8. An optical manipulator, comprising:
a substrate layer including an indium phosphide (InP);
a core layer including an indium gallium arsenide phosphide (InGaAsP) disposed on the substrate layer for propagating an optical signal; and
a cladding layer including the InP disposed on the core layer for manipulating the optical signal, the optical manipulator further comprising
a first section for propagating an optical signal with multiple polarization modes including a transverse electric (TE) mode and a transverse magnetic (TM) mode;
a second section for propagating separately the TE mode and the TM mode of the optical signal;
a multi-mode interference (MMI) section, wherein the MMI section includes a groove having a first refractive index less than a second refractive index of the MMI section and extending along an entire length of the MMI section partitioning the MMI section into two connected channels including a first channel and a second channel, wherein the first section is connected to the first channel and the second section is connected to both the first and the second channels, wherein a length of the MMI section is less than 1mm, and wherein dimensions of the groove and a refractive index within the groove are selected such that the TE mode and the TM mode of the optical signal are separated into the first and the second channels at an interface between the second section and the MMI section and merged at an interface between the first section and the first channel of the MMI section, wherein the groove is formed by etching the cladding layer.

9. The optical manipulator of claim 8, wherein the first section includes a waveguide connected to the first channel, the second section includes a second waveguide connected to the first channel and a third waveguide connected to the second channel, wherein refractive indexes of the first channel, the second channel, the first waveguide, the second waveguide and the third waveguide are equal to the second refractive index.

10. The optical manipulator of claim 9, wherein one or combination of the first waveguide, the second waveguide and the third waveguide are connected to the MMI section through a tapered coupling interface.

11. An optical manipulator, comprising:
a substrate layer including an indium phosphide (InP);
a core layer including an indium gallium arsenide phosphide (InGaAsP) disposed on the substrate layer; and
a cladding layer including the InP disposed on the core layer, wherein the cladding layer includes:
  a first section for propagating an optical signal with multiple polarization modes including a transverse electric (TE) mode and a transverse magnetic (TM) mode;
  a second section for propagating separately the TE mode and the TM mode of the optical signal; and
  a multi-mode interference (MMI) section, wherein the MMI section includes a groove having a first refractive index lower than a second refractive index of the MMI section and extending along an entire length of the MMI section partitioning the MMI section into two connected channels including a first channel and a second channel, wherein the first section is connected to the first channel and the second section is connected to the first channel and the second channel.

12. The optical manipulator of claim 11, wherein the groove is formed by etching the cladding layer.

13. The optical manipulator of claim 11, wherein the groove is embedded into the cladding layer material with the first refractive index.

14. The optical manipulator of claim 11, wherein a length of the optical manipulator is less than 1 mm.

15. An optical manipulator, comprising:
a substrate layer;
a core layer disposed on the substrate layer for propagating an optical signal; and
a cladding layer disposed on the core layer for manipulating the optical signal, wherein the optical manipulator further includes
a first section for propagating the optical signal with multiple polarization modes including a transverse electric (TE) mode and a transverse magnetic (TM) mode;
a second section for propagating separately the TE mode and the TM mode of the optical signal; and
a multi-mode interference (MMI) section, wherein the MMI section includes a groove having a first refractive index less than a second refractive index of the MMI section and extending along an entire length of the MMI section to partition the MMI section into two connected channels including a first channel and a second channel, wherein the first section is connected to the first channel and the second section is connected to both the first and the second channels.

* * * * *